United States Patent
Devarao et al.

(10) Patent No.: US 12,411,966 B2
(45) Date of Patent: Sep. 9, 2025

(54) COMPOSITE ANALYSIS CONTENT PRIVACY

(71) Applicant: International Business Machines Corporation, Armonk, NY (US)

(72) Inventors: Praveen Devarao, Bengaluru (IN); Arnaj Das, Kolkata (IN); Abu Kaf Qasim, Kanpur (IN); Ashwin Jain, Bodwad (IN)

(73) Assignee: International Business Machines Corporation, Armonk, NY (US)

( * ) Notice: Subject to any disclaimer, the term of this patent is extended or adjusted under 35 U.S.C. 154(b) by 730 days.

(21) Appl. No.: 17/573,146

(22) Filed: Jan. 11, 2022

(65) Prior Publication Data
US 2023/0222236 A1 Jul. 13, 2023

(51) Int. Cl.
- *G06F 21/62* (2013.01)
- *G06F 3/14* (2006.01)
- *G06F 40/279* (2020.01)
- *G06N 20/00* (2019.01)

(52) U.S. Cl.
CPC ........ *G06F 21/6218* (2013.01); *G06F 3/1454* (2013.01); *G06F 40/279* (2020.01); *G06N 20/00* (2019.01)

(58) Field of Classification Search
CPC .. G06F 21/6238; G06F 40/279; G06F 3/1454; G06N 20/00
See application file for complete search history.

(56) References Cited

U.S. PATENT DOCUMENTS

| | | | |
|---|---|---|---|
| 7,958,457 B1 * | 6/2011 | Brandenberg | G06F 1/1698 |
| | | | 715/811 |
| 9,141,332 B2 | 9/2015 | Coleman et al. | |
| 10,194,203 B2 | 1/2019 | Avila et al. | |
| 10,437,549 B2 | 10/2019 | Deenadayal | |
| 11,006,077 B1 * | 5/2021 | Truong | H04N 7/15 |
| 11,146,601 B1 * | 10/2021 | Silverstein | H04L 67/10 |

(Continued)

FOREIGN PATENT DOCUMENTS

| | | | | |
|---|---|---|---|---|
| CN | 111222450 A | 6/2020 | | |
| WO | WO-2022035371 A2 * | 2/2022 | ......... | G06F 21/6218 |

OTHER PUBLICATIONS

Mell et al., "The NIST Definition of Cloud Computing," Recommendations of the National Institute of Standards and Technology, U.S. Department of Commerce, Special Publication 800-145, Sep. 2011, 7 pages.

(Continued)

*Primary Examiner* — Darshan I Dhruv
(74) *Attorney, Agent, or Firm* — James L. Olsen

(57) ABSTRACT

A screen sharing session of a host computing device is detected. The screen sharing session includes a first video stream of a graphical user interface. The screen sharing session is directed to a set of one or more target computing devices. The screen sharing session is monitored for a set of one or more content elements. A first content element of the set of content elements in the first video stream is identified in response to the monitoring. The identification is based on the screen sharing session. The first video stream is intercepted in response to the identification of the first content element. Based on the first content element, the first video stream is altered.

14 Claims, 5 Drawing Sheets

(56) References Cited

U.S. PATENT DOCUMENTS

| | | | | |
|---|---|---|---|---|
| 2012/0036452 | A1* | 2/2012 | Coleman | G06F 21/55 |
| | | | | 715/751 |
| 2018/0336373 | A1* | 11/2018 | Deenadayal | G06T 5/70 |
| 2018/0374105 | A1* | 12/2018 | Azout | G06N 3/08 |
| 2019/0052819 | A1* | 2/2019 | Pogorelik | G06V 20/46 |
| 2019/0066279 | A1* | 2/2019 | Monkarsh | H04L 67/306 |
| 2020/0184080 | A1* | 6/2020 | Trim | G06F 21/84 |
| 2020/0342131 | A1* | 10/2020 | Giralt | G06F 3/0484 |
| 2020/0356779 | A1* | 11/2020 | Yu | G06V 10/7635 |
| 2023/0205897 | A1* | 6/2023 | Leblanc | G06F 21/606 |
| | | | | 726/26 |

OTHER PUBLICATIONS

"Get a Video Playback of How Visitors Interact with Your Website," PageSense, Printed Dec. 13, 2021, 6 pages, https://www.zoho.com/pagesense/analyze/session-recording.html.

* cited by examiner

COMPOSITE ANALYSIS CONTENT PRIVACY

BACKGROUND

The present disclosure relates to computer security, and more specifically, to secure screen sharing in computing environments.

Using a screen sharing utility in a computing environment may allow for users to remotely share information along with other users. The operation of screen sharing can be powerful in that the entirety of a user's screen is shared. The operation of screen sharing can also lead to a lack of security and privacy.

SUMMARY

According to embodiments, disclosed are a method, system, and computer program product.

A screen sharing session of a host computing device is detected. The screen sharing session includes a first video stream of a graphical user interface. The screen sharing session is directed to a set of one or more target computing devices. The screen sharing session is monitored for a set of one or more content elements. A first content element of the set of content elements in the first video stream is identified in response to the monitoring. The identification is based on the screen sharing session. The first video stream is intercepted in response to the identification of the first content element. Based on the first content element, the first video stream is altered.

The above summary is not intended to describe each illustrated embodiment or every implementation of the present disclosure.

BRIEF DESCRIPTION OF THE DRAWINGS

The drawings included in the present application are incorporated into, and form part of, the specification. They illustrate embodiments of the present disclosure and, along with the description, serve to explain the principles of the disclosure. The drawings are only illustrative of certain embodiments and do not limit the disclosure.

Figure 1:
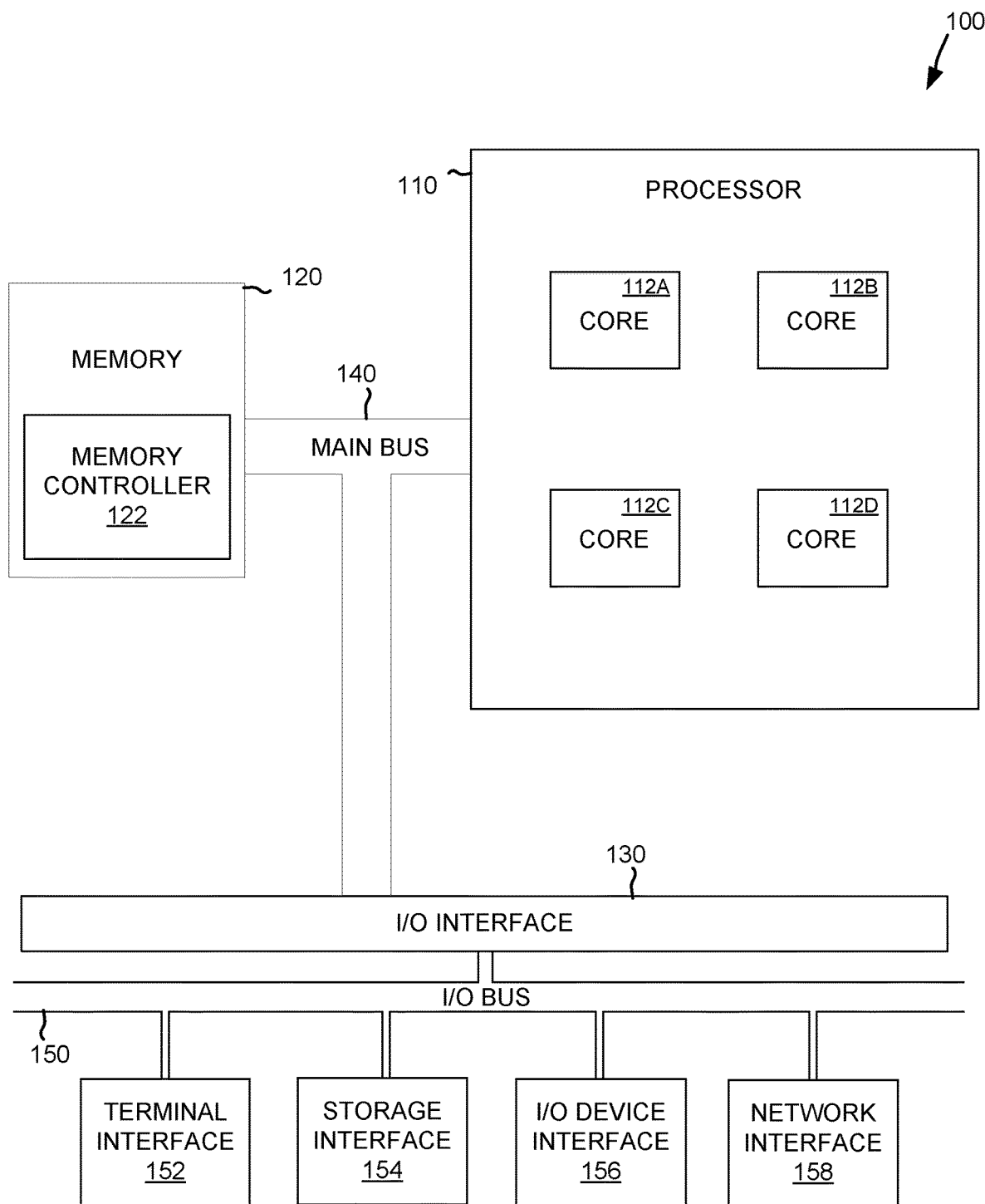
FIG. 1 depicts the representative major components of an example computer system that may be used, in accordance with some embodiments of the present disclosure.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention.

DETAILED DESCRIPTION

Aspects of the present disclosure relate to computer security; more particular aspects relate to secure screen sharing in computing environments. While the present disclosure is not necessarily limited to such applications, various aspects of the disclosure may be appreciated through a discussion of various examples using this context.

Many operations and tasks using computers may leverage a graphical user interface ("GUI"). A GUI may include the windows, icons, menus, and other affordances for manipulating content. For example, a web-browser may be displayed by a GUI and may render webpages for people to view and to interact on a laptop computer. In another example, a GUI on a smartwatch may show elements such as activity, calendars, time, and vital signs. Further, and in response to user input, the GUI may be updated by the smartwatch. A GUI may provide a user with clarity, context, discoverability, or other attributes that improve the speed a user interacts with and understands the computer. For example, a well-designed GUI for a computer may convey information to a user in a manner that is relatively easy to understand and enable the user to quickly act on content or a state of the computer.

Screen sharing may be one technique to provide or display information to other users. In computing, screen sharing (alternatively, remote desktop or sharing of their screen) may be software or functionality that provides or reproduces a GUI of a first computer remotely to one or more additional computer. For instance, a GUI may be transmitted by a network, such as the Internet, to additional computers. Each additional computer (alternatively, remote client) may receive and reproduce (e.g., render) an instance of the GUI that is being shared. The remote client may then facilitate other users to view the same content that is being rendered by the first computer.

Screen sharing may be increasingly used for computing amongst individuals that interact together. Specifically, people may meet and discuss every professional task or creative pursuit online. For example, a user may share their computing screen when they are performing work tasks, such as spreadsheets and writing tasks, to solicit advice from coworkers. In another example, a user may screen share to provide ideas to others, such as instructional videos or presentations of new material. In yet another example, a GUI may be screen shared to solicit help from others, such as guidance on how to interact with or use software of a computer. Additionally, screen sharing may be a way that various individuals spend leisure time. In detail, a first individual may share or stream a GUI of their computer screen to other individuals to entertain them. The first individual may be playing games, drawing, or performing other tasks through a GUI, and other individuals can watch the GUI and derive enjoyment.

For the sharing individual ("sharer"), screen sharing may be transparent; it may seem like a local or non-sharing GUI to a sharer. Similarly, for the individuals viewing a remote computer GUI ("viewer"), screen sharing may also be transparent; it may seem to a viewer that a screen sharing is just a local computer performing operations. Greater enjoyment and understanding may be derived from screen sharing. Specifically, users may also be communicating through other means, such as a voice or video call with each other. The sharer may be able to discuss with viewers whether they are properly using a computer or performing a computing task. Likewise, viewers may also be able to communicate with the sharer regarding the usage of a computer. Consequently, screen sharing sessions may help a sharer and a viewer more fully understand the content of the computing session and also more fully interact and commune (e.g., sharing stores, creating moments).

The nature of screen sharing may lead to drawbacks regarding security and privacy.

In detail, as the content of the screen is being shared, not only can the content that the sharer is focused on sharing be shared, but also other content. In business, for instance, in a video conferencing application, there may be situations where the content being displayed is general but additional content is displayed that is confidential, personal, or inappropriate. For example, though a presenter of a video conferencing application may intend only to share information from a first window of a desktop application, during a screen sharing the presenter accidentally shares information in additional windows that are also being displayed in a GUI.

Unintentionally exposing of on-screen data of a GUI during a screen sharing session can be costly, such as exposing private financial or trade secret information. The unintentional exposure of business information may then lead to malicious or unauthorized transactions. Additionally, screen sharing can lead to violating legal or regulatory requirements. For example, an employee of a company may be sharing their screen during a presentation in a first application. During the presentation, the employee may desire to switch to a web browsing application to provide examples to the audience. During usage, the employee may accidentally display on their screen confidential client information that is subject to regulatory issues.

In other cases, screen sharing can also lead to issues in more casual, artistic, educational, or entertainment situations. For example, during a video streaming session, a sharer may accidentally share some content, such as user generated text from a chat program, that describes or includes mature content or themes. This may be an issue as the audience of viewers may contain young or impressionable users that may accidentally read some of the inappropriate content or auditors that are tasked with ensuring that the sharer's content is age appropriate. The sharer may be reported and may lose the ability to stream in the future or may have their account suspended because inappropriate content that was inadvertently written by others was shared through screen sharing.

While there are workarounds for screen sharing, these workarounds have deficiencies. One workaround may be to pause screen sharing or switch the monitor or display where content is shared for a brief period. Unfortunately, switching of a monitor or display or pausing of a screen sharing session can be tedious and break the flow of information delivery. Further, pausing or switching may not work for all users. Specifically, some users who are not so adept at using screen sharing software may find these workarounds very time consuming or unintuitive. In some cases, the pausing and switching may actually confuse or frustrate a user, and inadvertently private or secure information may be displayed because a user was attempting to prevent the sharing of certain information. Even experienced users may forget or make a mistake, due to stress of work or loss of concentration; an experienced user may mistakenly share information unintentionally or unknowingly.

Composite analysis content privacy (CACP) may provide advancements in screen sharing by making it practical to perform screen sharing while protecting information that is a part of the screen sharing session. CACP may operate by detecting the presence of a screen sharing session and may monitor for and identify specific content elements in a video stream. The monitoring of content elements may be based on performing artificial intelligence operations on the video stream to identify the specific content elements. The specific content elements may be imagery or text that should not be shared or is unintentionally shared by a sharer. For example, the content elements may include private information such as usernames, passwords, account numbers, or other information. The content elements may include information that is not intended for a specific audience, such as swear or forbidden words, adult themes, or graphic content that may not be appropriate or targeted to a younger audience of viewers. CACP may operate by altering a video stream such that certain information is no longer viewable.

CACP may be configured to monitor for or identify certain content elements based on performing one or more artificial intelligence operations. Specifically, CACP may be configured to perform image analysis on a screen sharing session of a source computer of a screen sharing session to identify content or information that should not be shared. CACP may perform natural language processing on text input to the computer that is the source of screen sharing to identify content or information that should not be shared. CACP may operate to perform processing based on application information of the computer that is the source of screen sharing (e.g., information from a renderer, information from a kernel, information from an operating system, active windows, inactive but displayed windows, application titles, and program names).

CACP may operate using artificial intelligence with reduced processing cycles by operating with a machine learning model that features increased accuracy for each iteration of monitoring. For example, CACP may leverage a machine learning ("ML") model that operates as a multimodal model ("MMM") that inputs not only images of screen usage, but also text input from a user, and application statuses of an active computer system. The multimodal model may be configured to identify content that should not be shared as part of the screen sharing session with more accuracy. For example, an MMM may operate to identify a particular content element that should not be shared with an increased accuracy as compared to a single modal ML model. In another example, an MMM may operate to identify a particular content element with a higher confidence score as compared to a single modal ML model. CACP may use input from various sources, such as text from keyboard buffers, image rasterization from frame buffers, application status from operation machine application lists, and the like. Consequently, CACP may be more accurate as compared to other image-only based analysis and monitoring in the speed and accuracy of identifying content and information that should be protected in screen sharing.

CACP may operate by altering a video stream such that certain information is no longer viewable. Altering of the video stream may include smearing, smudging, blurring, removing, deemphasizing, or obscuring the video stream in whole or in part. Altering of the video stream may include otherwise altering the video stream such that the content elements that are identified are not discernable by a user of a target of the stream (alternatively, viewer). Altering of the video stream may include intercepting the unaltered video stream; changing or modifying portions of the unaltered video stream; and generating a second video stream for target computing devices. The second video stream may be reproduced (e.g., rendered, received, played, displayed) by a target computing without the identified content elements.

The altering of the video stream by CACP may include replacing an identified content element with a new content element. For example, CACP may monitor a video stream of a screen sharing of a company presentation to outside investors. CACP may identify trade secret information that should not be provided to the outside investors. CACP may alter the video stream before it reaches a target computer of any outside investor. The altered video stream may include a company logo, or a benign privacy text. The alteration may not be identifiable by a viewer. Specifically, CACP may composite or insert the new content elements that contain benign or shareable public information such that it appears as part of a convincing or accurate representation of a GUI. For example, a first content element of a GUI may be replaced with new information in such a way that it appears there is no distortion or alteration of a screen sharing to a viewer. In another example, in a first screen sharing, a first content element of a GUI may be in a background window that is partially obscured by an active application window. CACP may alter the background window by replacing the first content element with new content that includes text that is also partially obscured by the active application window.

FIG. 1 depicts the representative major components of an example computer system 100 (alternatively, computer) that may be used, in accordance with some embodiments of the present disclosure. It is appreciated that individual components may vary in complexity, number, type, and/or configuration. The particular examples disclosed are for example purposes only and are not necessarily the only such variations. The computer system 100 may include a processor 110, memory 120, an input/output interface (herein I/O or I/O interface) 130, and a main bus 140. The main bus 140 may provide communication pathways for the other components of the computer system 100. In some embodiments, the main bus 140 may connect to other components such as a specialized digital signal processor (not depicted).

The processor 110 of the computer system 100 may be comprised of one or more cores 112A, 112B, 112C, 112D (collectively 112). The processor 110 may additionally include one or more memory buffers or caches (not depicted) that provide temporary storage of instructions and data for the cores 112. The cores 112 may perform instructions on input provided from the caches or from the memory 120 and output the result to caches or the memory. The cores 112 may be comprised of one or more circuits configured to perform one or more methods consistent with embodiments of the present disclosure. In some embodiments, the computer system 100 may contain multiple processors 110. In some embodiments, the computer system 100 may be a single processor 110 with a singular core 112.

The memory 120 of the computer system 100 may include a memory controller 122. In some embodiments, the memory 120 may include a random-access semiconductor memory, storage device, or storage medium (either volatile or non-volatile) for storing data and programs. In some embodiments, the memory may be in the form of modules (e.g., dual in-line memory modules). The memory controller 122 may communicate with the processor 110, facilitating storage and retrieval of information in the memory 120. The memory controller 122 may communicate with the I/O interface 130, facilitating storage and retrieval of input or output in the memory 120.

The I/O interface 130 may include an I/O bus 150, a terminal interface 152, a storage interface 154, an I/O device interface 156, and a network interface 158. The I/O interface 130 may connect the main bus 140 to the I/O bus 150. The I/O interface 130 may direct instructions and data from the processor 110 and memory 120 to the various interfaces of the I/O bus 150. The I/O interface 130 may also direct instructions and data from the various interfaces of the I/O bus 150 to the processor 110 and memory 120. The various interfaces may include the terminal interface 152, the storage interface 154, the I/O device interface 156, and the network interface 158. In some embodiments, the various interfaces may include a subset of the aforementioned interfaces (e.g., an embedded computer system in an industrial application may not include the terminal interface 152 and the storage interface 154).

Logic modules throughout the computer system 100—including but not limited to the memory 120, the processor 110, and the I/O interface 130—may communicate failures and changes to one or more components to a hypervisor or operating system (not depicted). The hypervisor or the operating system may allocate the various resources available in the computer system 100 and track the location of data in memory 120 and of processes assigned to various cores 112. In embodiments that combine or rearrange elements, aspects and capabilities of the logic modules may be combined or redistributed. These variations would be apparent to one skilled in the art.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed. Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 2:
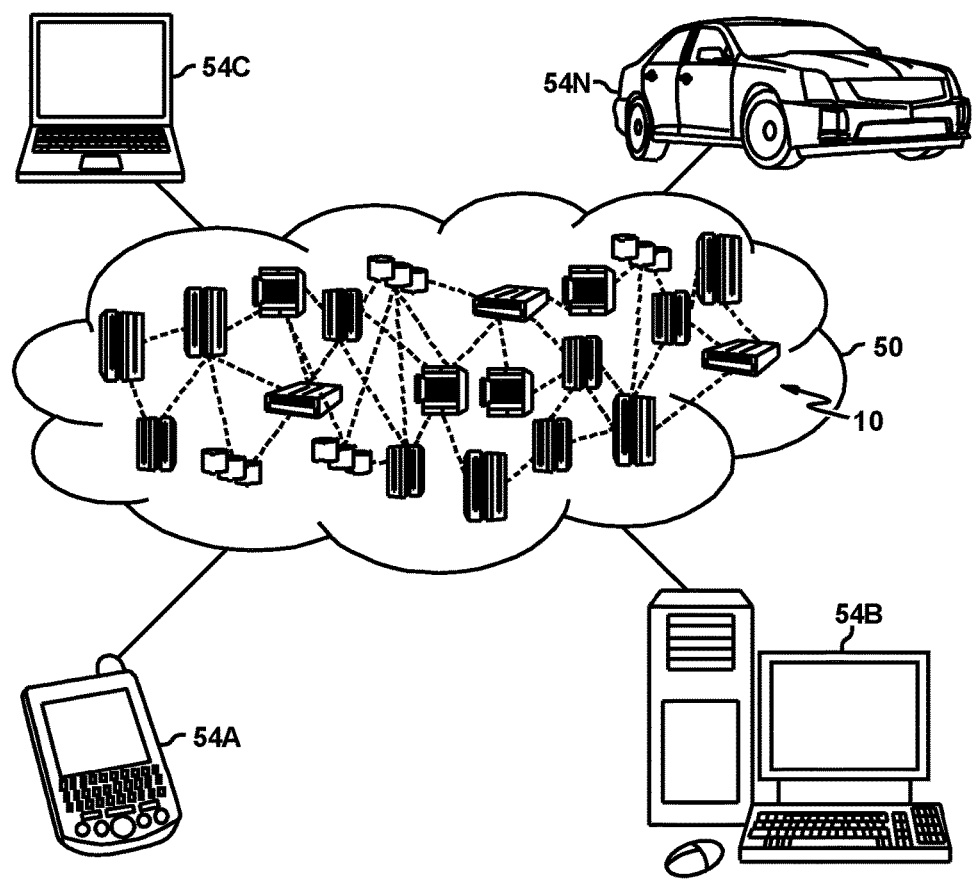
FIG. 2 depicts a cloud computing environment according to an embodiment of the present invention.

Referring now to FIG. 2, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
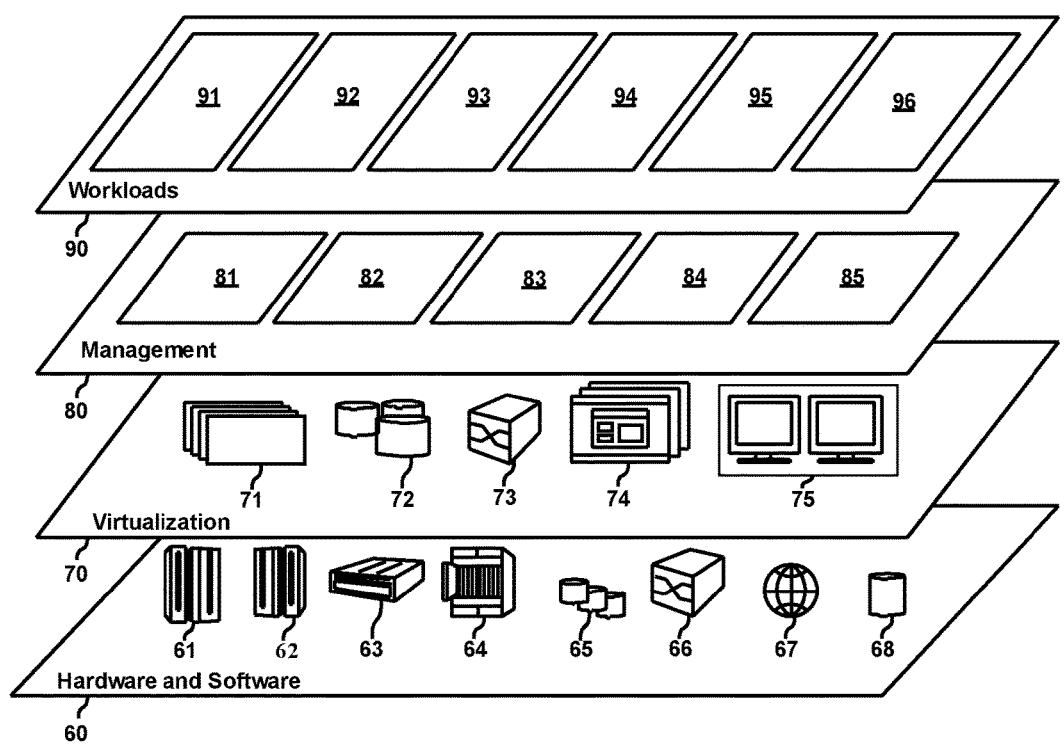
FIG. 3 depicts abstraction model layers according to an embodiment of the present invention.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68. Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and CACP 96.

In some embodiments, CACP may use artificial intelligence. "Artificial Intelligence" (AI) may be one example of cognitive systems that relate to the field of computer science directed at computers and computer behavior as related to humans and man-made and natural systems. Cognitive computing may utilize self-teaching algorithms that use, for example, and without limitation, data analysis, visual recognition, behavioral monitoring, and natural language processing (NLP) to solve problems and optimize human processes. The data analysis and behavioral monitoring features may analyze the collected relevant data and behaviors as subject matter data as received from the sources as discussed herein. As the subject matter data is received, organized, and stored, the data analysis and behavioral monitoring features may analyze the data and behaviors to determine the relevant details through computational analytical tools which allow the associated systems to learn, analyze, and understand human behavior, including within the context of the present disclosure. With such an understanding, the AI may surface concepts and categories, and apply the acquired knowledge to teach (alternatively, train) the AI the relevant portions of the received data and behaviors. In addition to human behaviors and data, the AI may also be taught to analyze data and behaviors of man-made and natural systems.

In addition, cognitive systems such as AI, based on information, may make decisions, which maximizes the chance of success in a given topic. More specifically, AI may learn from a dataset, including behavioral data, to solve problems and provide relevant recommendations. For example, in the field of artificial intelligent computer systems, machine learning (ML) systems process large volumes of data, seemingly related or unrelated, where the ML systems may be trained with data derived from a database or corpus of knowledge, as well as recorded behavioral data. The ML systems may look for, and determine, patterns, or lack thereof, in the data, "learn" from the patterns in the data, and ultimately accomplish tasks without being given specific instructions. In addition, the ML systems—utilizing algorithms, represented as machine processable models—may learn from the data and create foresights based on this data. More specifically, ML may include the application of AI, such as, and without limitation, through creation of neural networks that can demonstrate learning behavior by performing tasks that are not explicitly programmed. Deep learning may include a type of neural-network ML in which systems can accomplish complex tasks by using multiple layers of choices based on output of a previous layer, creating increasingly smarter and more abstract conclusions.

ML learning systems may have different "learning styles." One such learning style is supervised learning, where the data is labeled to train the ML system through telling the ML system what the key characteristics of a thing are with respect to its features, and what that thing actually is. If the thing is an object or a condition, the training process is called classification. Supervised learning includes determining a difference between generated predictions of the classification labels and the actual labels, and then minimize that difference. If the thing is a number, the training process is called regression. Accordingly, supervised learning specializes in predicting the future.

A second learning style is unsupervised learning, where commonalities and patterns in the input data are determined by the ML system through little to no assistance by humans. Most unsupervised learning focuses on clustering, i.e., grouping the data by some set of characteristics or features. These may be the same features used in supervised learning, although unsupervised learning typically does not use labeled data. Accordingly, unsupervised learning may be used to find outliers and anomalies in a dataset, and cluster the data into several categories based on the discovered features.

Semi-supervised learning is a hybrid of supervised and unsupervised learning that includes using labeled as well as unlabeled data to perform certain learning tasks. Semi-supervised learning permits harnessing the large amounts of unlabeled data available in many use cases in combination with typically smaller sets of labelled data. Semi-supervised classification methods are particularly relevant to scenarios where labelled data is scarce. In those cases, it may be difficult to construct a reliable classifier through either supervised or unsupervised training. This situation occurs in application domains where labelled data is expensive or difficult obtain, like computer-aided diagnosis, drug discovery and part-of-speech tagging. If sufficient unlabeled data is available and under certain assumptions about the distribution of the data, the unlabeled data can help in the construction of a better classifier through classifying unlabeled data as accurately as possible based on the documents that are already labeled.

A third learning style is reinforcement learning, where positive behavior is "rewarded: and negative behavior is "punished." Reinforcement learning uses an "agent," the agent's environment, a way for the agent to interact with the environment, and a way for the agent to receive feedback with respect to its actions within the environment. An agent may be anything that can perceive its environment through sensors and act upon that environment through actuators. Therefore, reinforcement learning rewards or punishes the ML system agent to teach the ML system how to most appropriately respond to certain stimuli or environments. Accordingly, over time, this behavior reinforcement facilitates determining the optimal behavior for a particular environment or situation.

Deep learning may include a method of machine learning that incorporates neural networks in successive layers to learn from data in an iterative manner. Neural networks are models of the way the nervous system operates. Basic units are referred to as neurons, which are typically organized into layers. The neural network works by simulating a large number of interconnected processing devices that resemble abstract versions of neurons. There are typically three parts in a neural network, including an input layer, with units representing input fields, one or more hidden layers, and an output layer, with a unit or units representing target field(s). The units are connected with varying connection strengths or weights. Input data are presented to the first layer, and values are propagated from each neuron to every neuron in the next layer. At a basic level, each layer of the neural network includes one or more operators or functions operatively coupled to output and input. Output from the operator(s) or function(s) of the last hidden layer is referred to herein as activations. Eventually, a result is delivered from the output layers. Deep learning complex neural networks are designed to emulate how the human brain works, so computers can be trained to support poorly defined abstractions and problems. Therefore, deep learning is used to predict an output given a set of inputs, and either supervised learning or unsupervised learning can be used to facilitate such results.

Figure 4:
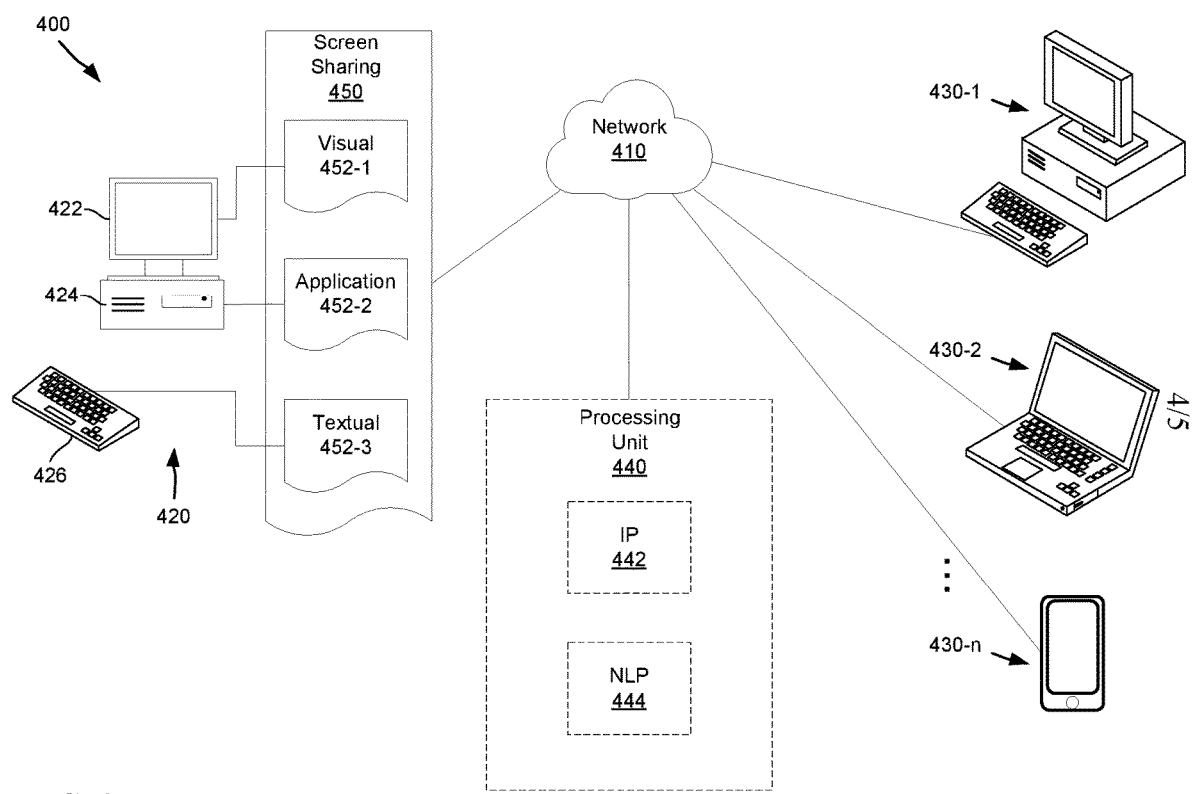
FIG. 4 depicts a system for performing content security during a screen sharing session, consistent with some embodiments of the disclosure.

FIG. 4 depicts a system 400 of performing content security during a screen sharing session, consistent with some embodiments of the disclosure. System 400 may be configured to perform CACP consistent with some embodiments of the disclosure. Specifically, system 400 may be configured to monitor for and detect a screen sharing session that includes a video stream. Further, and responsive to identification of specific content elements in the screen sharing session, system 400 may be configured to alter the video stream before it is displayed by other computer devices. System 400 may include any of the following: a network 410 for facilitating electronic communication; a host device 420 for hosting a screen sharing session; a set of target devices, including target device 430-1, target device 430-2, up to target device 430-*n* (collectively, target devices 430); and a processing unit 440.

Network 410 can be implemented using any number of any suitable physical and/or logical communications topologies. The network 410 can include one or more private or public computing networks. For example, network 410 may comprise a private network (e.g., a network with a firewall that blocks non-authorized external access) that is associated with a particular function or workload (e.g., communication, streaming, hosting, sharing), or set of software or hardware clients. Alternatively, or additionally, network 410 may comprise a public network, such as the Internet. Consequently, network 410 may form part of a data unit network (e.g., packet-based)—for instance, a local-area network, a wide-area network, and/or a global network.

Network 410 can include one or more servers, networks, or databases, and can use one or more communication protocols to transfer data between other components of system 400. Furthermore, although illustrated in FIG. 4 as a single entity, in other examples network 410 may comprise a plurality of networks, such as a combination of public and/or private networks. The communications network 410 can include a variety of types of physical communication channels or "links." The links can be wired, wireless, optical, and/or any other suitable media. In addition, the communications network 410 can include a variety of network hardware and software (not depicted) for performing routing, switching, and other functions, such as routers, switches, base stations, bridges or any other equipment that may be useful to facilitate communicating data.

System 400 may include any of the following: a network 410 for facilitating electronic communication; a host device 420 for hosting a screen sharing session; a set of target devices, including target device 430-1, target device 430-2, up to target device 430-n (collectively, target devices 430); and a processing unit 440.

Host device 420 of system 400 may be a computer system, such as computer 100. Host device 420 may include any of the following: display 422, main processor 424, and keyboard 426. Display 422 may be an integrated or external output device configured to render or otherwise provide a graphical user interface ("GUI"). Main processor 424 may contain a memory and processor (not depicted) and may be configured to generate a GUI (not depicted) and transmit the generated GUI to the display 422. The keyboard 426 may be an input device configured to receive input from a user (not depicted).

In operation, host device 420 may be configured to execute software and respond to requests from a user. For example, main processor 424 of host device 420 may execute an operating system, kernel, and/or hypervisor that manages the execution, display, and ordering of applications. The main processor 424 may further generate the GUI that includes one or more application windows and provide the GUI to the display 422 for viewing by the user. The user may use one or more input devices, such as keyboard 426, to provide input to the main processor 424, and in that way, operate the host device 420. The host device 420 may provide to other computing devices, such as target devices 430, a screen sharing session through network 410. The screen sharing session may be a video stream that includes a reproduction or copy of the GUI that is rendered by display 422.

Target devices 430 of system 400 may be examples of devices that are configured to receive a screen sharing session, such as provided by host device 420. Each target device 430 may be an instance of a computer system, such as computer 100. The target devices 430 may be operated by or assigned to various users (not depicted). For example, each target device 430 may have a username, login, profile, or other data associated with the target device 430.

Processing unit 440 may be configured to perform CACP based on a screen sharing session. In some embodiments, processing unit 440 may be a part of the host device 420. For example, processing unit 440 may be hardware, software, or some combination, such as an integrated circuit of, or software utility installed on host device 420. In some embodiments, processing unit 440 may be a separate computer system (such as computer 100) or a part of an abstracted computer (such as being hosted by cloud computing environment 50).

In some embodiments, one or more processing unit(s) 440 may be a part of a given target device 430. For example, an instance of processing unit 440 may be a hardware or software component of each target device 430 that is configured to receive a screen sharing session. Each instance of processing unit 440 may be configured to perform CACP operations based, in part on one or more preferences of a user, such as users of one or more target devices 430. For example, a first instance of processing unit 440 may be located in target device 430-1 and a second instance of processing unit 440 may be located in target device 430-2. Each instance may be configured to monitor a screen sharing session and alter the session in a first way for a first audience (e.g., an audience of children) and to monitor and alter a screen sharing session in a second way for a second audience (e.g., an audience of adults). The alterations may be based in part on the username, profile, login, or other associated data of the user that is stored on the target devices 430.

Processing unit 440 may be an instance of an artificial intelligence, such as a set of one or more machine learning models configured to operate on screen sharing sessions. In detail, host device 420 may output a screen sharing session 450. The screen sharing session 450 may include a video stream that captures a GUI of host device 420 (e.g., a copy of the image that is provided by display 422). The screen sharing session 450 may include other information, such as metadata (not depicted) that describes the screen sharing session 450. The metadata may include, a title, a host username, a timestamp, and the like. The screen sharing session 450 may be generated based on operation of the host device 420. Specifically, as the user enters text (alternatively, textual input) with the keyboard 426, the main processor 424 may react and, together with built-in software, an image may be provided to the display 422.

In some embodiments, the processing unit 440 may execute machine learning on data using one or more of the following example techniques: K-nearest neighbor (KNN), learning vector quantization (LVQ), self-organizing map (SOM), logistic regression, ordinary least squares regression (OLSR), linear regression, stepwise regression, multivariate adaptive regression spline (MARS), ridge regression, least absolute shrinkage and selection operator (LASSO), elastic net, least-angle regression (LARS), probabilistic classifier, naïve Bayes classifier, binary classifier, linear classifier, hierarchical classifier, canonical correlation analysis (CCA), factor analysis, independent component analysis (ICA), linear discriminant analysis (LDA), multidimensional scaling (MDS), non-negative metric factorization (NMF), partial least squares regression (PLSR), principal component analysis (PCA), principal component regression (PCR), Sammon mapping, t-distributed stochastic neighbor embedding (t-SNE), bootstrap aggregating, ensemble averaging, gradient boosted decision tree (GBRT), gradient boosting machine (GBM), inductive bias algorithms, Q-learning, state-action-reward-state-action (SARSA), temporal difference (TD) learning, apriori algorithms, equivalence class transformation (ECLAT) algorithms, Gaussian process regression, gene expression programming, group method of data handling (GMDH), inductive logic programming, instance-based learning, logistic model trees, information fuzzy networks (IFN), hidden Markov models, Gaussian naïve Bayes, multinomial naïve Bayes, averaged one-dependence estimators (AODE), Bayesian network (BN), classification and regression tree (CART), chi-squared automatic interaction detection (CHAID), expectation-maximization algorithm, feedforward neural networks, logic learning machine, self-organizing map, single-linkage clustering, fuzzy clustering, hierarchical clustering, Boltzmann machines, convolutional neural networks, recurrent neural networks, hierarchical temporal memory (HTM), and/or other machine learning techniques.

The operation of the host device 420 during a GUI and during a screen sharing session 450 may be related to a set of one or more factors. The set of factors may also include information or details about a user of the host device 420. The factors may include visual modalities 452-1, application modalities 452-2, and textual modalities 452-3 (collectively, modalities 452) that describe the state of the host device 420 during operation. The processing unit 440 may monitor the screen sharing session 450 and may identify content elements based on the set of factors. In a first example, the processing unit 440 may identify user information of a profile stored on the host device 420, such as the employment role of the user of the host device. In a second example, the processing unit 440 may identify the shape of certain windows that relate to various content elements based on the visual modalities 452-1. In third example, the processing unit 440 may identify the type of application running based on access to operating system details that are a portion of the application modalities 452-2. In a fourth example, the processing unit 440 may identify the commands and content type by a user through the keyboard 426, from the textual modalities 452-3.

In some embodiments, the processing unit 440 may be configured to monitor and identify content elements based on a combination of factors across modalities. In a fifth example, if a command terminal application is opened, a first modality that is an application modality 452-2 may be monitored by the processing unit 440. The processing unit 440 may determine that potentially sensitive or unwanted to share content elements are potentially or likely to be displayed based on the monitoring of the application modality 452-2. Continuing the fifth example, if a user types into the command terminal application a curl command, the processing unit 440 may identify the textual modalities 452-3 and may intercept and alter the display of the terminal window, such that the entire terminal window is unreadable for the target devices 430. Further, the processing unit 440 may perform image analysis on the visual modalities 452-1 that represent the command terminal application and may identify both generic commands and other information. The processing unit 440 may analyze the other information and compare the other information with a profile of the user and identify authentication information of the user as confidential data. Further, the processing unit 440 may again alter the screen sharing session 450 to permit portions of the command terminal application that depict generic commands as visible but may continue to alter or otherwise obscure the confidential data. As a result, the screen sharing 450 may depict an unobscured or unmodified version of the terminal window in regions that contain only generic commands, but also may depict obscured or modified versions of the terminal window with secure, sensitive, private, or confidential information.

Processing unit 440 may leverage operations of various specialized components configured to operate on a screen sharing session (e.g., modalities 452 of screen sharing session 450) include the following: an image processor 442 and a natural language processor 444. Specifically, the image processor 442 may be configured to analyze visual portions of the visual modalities 452-1, the application modalities 452-2, and the textual modalities 452-3. For example, the image processor 442 may be configured to analyze a portion of text, a window, an application window, an inactive background window, and the like. Similarly, the natural language processor 444 may be configured to analyze textual portions of the visual modalities 452-1, the application modalities 452-2, and the textual modalities 452-3. For example, the natural language processor 444 may be configured to analyze text from a GUI (in some embodiments, received from the image processor 442), application status from an operating system of the host device 426, and text from the keyboard 426.

The image processor 442 may be a collection of hardware and software, such as an application specific integrated circuit. The image processor 442 may be configured to perform various image analysis techniques. The image analysis techniques may be machine learning and/or deep learning-based techniques. These techniques may include, but are not limited to, region-based convolutional neural networks (R-CNN), you only look once (YOLO), edge matching, clustering, grayscale matching, gradient matching, invariance models, geometric hashing, scale-invariant feature transform (SIFT), speeded up robust feature (SURF), histogram of oriented gradients (HOG) features, and single shot multibox detector (SSD). In some embodiments, the image processor may be configured to aid in identifying windows, icons, menus, pointers and other components of a GUI.

In some embodiments, objects may be identified using an object detection algorithm, such as an R-CNN, YOLO, SSD, SIFT, Hog features, or other machine learning and/or deep learning object detection algorithms. The output of the object detection algorithm may include one or more identities of one or more respective objects with corresponding match certainties. For example, a screen sharing session 450 may be analyzed. Using a relevant object detection algorithm, one or more content elements that are to be secured may be identified.

In some embodiments, features of the objects may be determined using a supervised machine learning model built using training data. For example, an image may be input into the supervised machine learning model and various classifications detected within the image can be output by the model. For example, characteristics such shape, size, color, and other characteristics may be output by the supervised machine learning model. Further, the identification of objects (e.g., icons, paragraphs, window borders, etc.) can be output as classifications determined by the supervised machine learning model.

In some embodiments, characteristics of objects may be determined using photogrammetry techniques. For example, shapes and dimensions of objects may be approximated using photogrammetry techniques. As an example, if a user provides an image of a basket, the diameter, depth, thickness, etc. of the basket may be approximated using photogrammetry techniques. In some embodiments, characteristics of objects may be identified by referencing an ontology. For example, if an object is identified (e.g., using an R-CNN), the identity of the object may be referenced within an ontology to determine corresponding attributes of the object. The ontology may indicate attributes such as color, size, shape, use, etc. of the object.

Characteristics may include the shapes of objects, dimensions (e.g., height, length, and width) of objects, a number of objects (e.g., three windows displayed in a GUI), colors of object, and/or other attributes of objects. In some embodiments, the output may generate a list including the identity and/or characteristics of objects (e.g., a first active terminal window, a second inactive document editor window, a third application launcher, etc.). In some embodiments, the output may include an indication that an identity or characteristic of an object is unknown. The indication may include a request for additional input data that can be analyzed such that the identity and/or characteristics of objects may be ascertained. In some embodiments, various objects, object attributes, and relationships between objects (e.g., hierarchical and direct relations) may be represented within a knowledge graph (KG) structure. Objects may be matched to other objects based on shared characteristics (e.g., one active window, a plurality of inactive but visually displayed windows), relationships with other objects (e.g., menu items are a part of the chrome of an inactive window), or objects belonging to the same class (e.g., two paragraphs of text that are within the boundary of a window of text in a GUI).

The natural language processor 444 may include various components (not depicted) operating through hardware, software, or in some combination, for example, a physical processor, one or more data sources, a search application, and a report analyzer. The natural language processor 444 may be a computer module that analyzes the received content and other information. The natural language processor 444 may perform various methods and techniques for analyzing textual information (e.g., syntactic analysis, semantic analysis, etc.). The natural language processor 444 may be configured to recognize and analyze any number of natural languages. In some embodiments, the natural language processor 444 may parse passages of documents or content from screen sharing session 450. Various components (not depicted) of the natural language processor 444 may include, but are not limited to, a tokenizer, a part-of-speech (POS) tagger, a semantic relationship identifier, and a syntactic relationship identifier. The natural language processor 444 may include a support vector machine (SVM) generator to processor the content of topics found within a corpus and classify the topics.

In some embodiments, the tokenizer may be a computer module that performs lexical analyses. The tokenizer may convert a sequence of characters into a sequence of tokens. A token may be a string of characters included in an electronic document and categorized as a meaningful symbol. Further, in some embodiments, the tokenizer may identify word boundaries in an electronic document and break any text passages within the document into their component text elements, such as words, multiword tokens, numbers, and punctuation marks. In some embodiments, the tokenizer may receive a string of characters, identify the lexemes in the string, and categorize them into tokens.

Consistent with various embodiments, the POS tagger may be a computer module that marks up a word in passages to correspond to a particular part of speech. The POS tagger may read a passage or other text in natural language and assign a part of speech to each word or other token. The POS tagger may determine the part of speech to which a word (or other text element) corresponds based on the definition of the word and the context of the word. The context of a word may be based on its relationship with adjacent and related words in a phrase, sentence, or paragraph.

In some embodiments, the context of a word may be dependent on one or more previously analyzed electronic documents (e.g., text from documents as provided by main processor 424, text from keyboard 426). Examples of parts of speech that may be assigned to words include, but are not limited to, nouns, verbs, adjectives, adverbs, and the like. Examples of other part of speech categories that POS tagger may assign include, but are not limited to, comparative or superlative adverbs, wh-adverbs, conjunctions, determiners, negative particles, possessive markers, prepositions, wh-pronouns, and the like. In some embodiments, the POS tagger may tag or otherwise annotate tokens of a passage with part of speech categories. In some embodiments, the POS tagger may tag tokens or words of a passage to be parsed by other portions of the natural language processor 444.

In some embodiments, the semantic relationship identifier may be a computer module that may be configured to identify semantic relationships of recognized text elements (e.g., words, phrases) in documents. In some embodiments, the semantic relationship identifier may determine functional dependencies between entities and other semantic relationships.

Consistent with various embodiments, the syntactic relationship identifier may be a computer module that may be configured to identify syntactic relationships in a passage composed of tokens. The syntactic relationship identifier may determine the grammatical structure of sentences such as, for example, which groups of words are associated as phrases and which word is the subject or object of a verb. The syntactic relationship identifier may conform to formal grammar.

In some embodiments, the natural language processor 444 may be a computer module that may parse a document and generate corresponding data structures for one or more portions of the document. For example, in response to receiving a link or program reference to a document that is rendered in a GUI of host device 420, the natural language processor 444 may output parsed text elements from the data of the referenced document. In some embodiments, a parsed text element may be represented in the form of a parse tree or other graph structure. To generate the parsed text element, the natural language processor 444 may trigger computer modules including the tokenizer, the part-of-speech (POS) tagger, the SVM generator, the semantic relationship identifier, and the syntactic relationship identifier.

In some embodiments, the natural language processor 444 may leverage one or more of the example machine learning techniques to perform machine-learning (ML) text operations. Specifically, the natural language processor 444 may operate to perform machine-learning text classification and/or a machine-learning text comparison. Machine-learning text classification may include ML text operations to convert, characters, text, words, and phrases to numerical values. The numerical values may then be input into a neural network to determine various features, characteristics, and other information of words with respect to a document or in relation to other words (e.g., to classify a numerical value associated with a word may permit the classification of a word). Machine-learning text comparison may include using the numerical values of converted characters, text, words, and phrases for performing a comparison. The comparison may be a comparison of a numerical value of a first word or other text to the numerical value of a second word or other text. The determination of the machine-learning text comparison may be to determine a scoring, a correlation, or a relevant relationship (e.g., a relationship between a first numerical value of a first word and a second numerical value of a second word). The comparison may be used to determine if two words are similar or different based on one or more criteria. The numerical operations of a machine-learning text classification/comparison may be a function of a mathematical operation performed through a neural network, such as performing a linear regression, an addition, or other relevant mathematical operation of the numerical value representative of a word or other text.

The ML text operations may include word encoding, such as one-hot encoding of words from a tokenizer, POS tagger, semantic relationship identifier, syntactic relationship identifier, and the like. The ML text operations may include the use of vectorization of text, such as the vectorization of words from a tokenizer, POS tagger, semantic relationship identifier, syntactic relationship identifier, and the like. For example, a paragraph of text may include the phrase "orange is a fruit that grows on trees." Vectorization of the word "orange" may include setting input neurons of a neural network to the various words of the phrase including the word "orange." The output value may be an array of values (e.g, forty-eight numbers, thousands of numbers). The output values may trend towards "1" for related words and may trend towards "0" for unrelated words. The related words may be related based on one or more of the following: similar parts of speech, syntactical meaning, locality within a sentence or paragraph, or other relevant "closeness" between the input and other parts of natural language (e.g., other parts of the phrase "orange is a fruit that grows on trees", other parts of a paragraph that contains the phrase, other parts of language).

Figure 5:
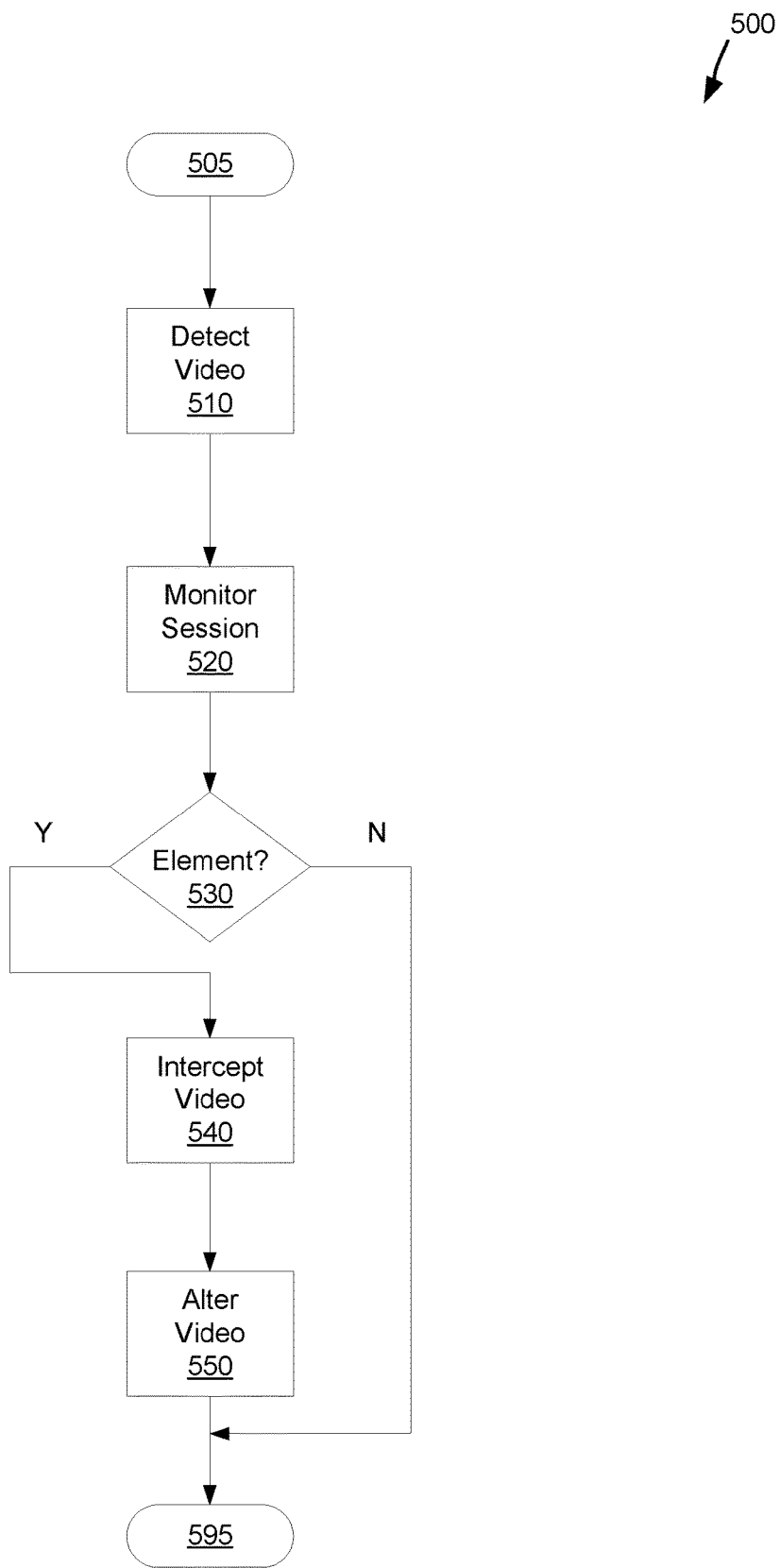
FIG. 5 depicts a method of performing content security, consistent with some embodiments of the disclosure.

FIG. 5 depicts a method 500 of performing content security, consistent with some embodiments of the disclosure. Method 500 may implement one or more operations of CAPC to secure content elements of a screen sharing session. Method 500 may generally be implemented in fixed-functionality hardware, configurable logic, logic instructions, etc., or any combination thereof. For example, the logic instructions might include assembler instructions, ISA instructions, machine instructions, machine dependent instructions, microcode, state-setting data, configuration data for integrated circuitry, state information that personalizes electronic circuitry and/or other structural components that are native to hardware (e.g., host processor, central processing unit/CPU, microcontroller, etc.).

From start at 505, a first video stream may be detected at 510. The video stream may be a portion of a screen sharing session. The detection may include listening for or monitoring of application activity that is related to screen sharing. Specifically, a particular application that is running on a computing device may operate as a screen sharing server or client. For example, a screen sharing host may be an application installed or running on a host computing device, such as host device 420. The screen sharing host may be in an inactive state, such as not currently running or not currently transmitting a copy or rendition of a graphical user interface of a host device. The detection of the video stream may be a detection that a screen sharing session is actively transmitting, sending, or recording of a screen sharing session by a host device. The detection of the video stream may be a detection that a screen sharing session is actively being received by a target device, such as by a screen sharing client running on a target device, such as target device 430. The screen sharing session may also include non-visual information, such as textual input from a user of a host device or application statuses from the host device. The textual input may be from a keyboard of the host device, as responsive to input from a user. The application statuses may be from the host device, such as information regarding the display, rendering, placement, priority, visibility, and other statuses of windows and applications from an operating system, composition engine, hypervisor, kernel or other component of a host device.

At 520, the screen sharing session may be monitored for content elements. Monitoring of the screen sharing session may include processing the visual information that is generated by a given host device. For example, as a user uses a host computer, the host computer may generate a visual representation of various operations as a GUI. The monitoring may include performing visual analysis (e.g., image analysis, machine learning) on the GUI. Monitoring of the screen sharing session may include processing of the non-visual information. Specifically, non-visual information may be information that is monitored that does not originate from the rendered GUI of a host device. By way of non-limiting example, text from file names, metadata elements, application instance data, window compositing engine information, may be considered non-visual information.

Monitoring of the screen sharing session may include processing of the non-visual information that is generated directly by a given host device. For example, as a user uses a host computer, the host computer may generate textual data and application data. The textual and application data may include various statuses (e.g., active, foreground, background, obscured, partially obscured, unobscured) for the states of various applications and their related windows. The monitoring of the screen sharing session may include processing of non-visual information that is generated by a user. For example, as a user types, emphasizes, evokes, or otherwise manipulates data, by way of a keyboard, that data may be monitored. The monitoring may include the monitoring to identify a particular portion of the screen sharing session as including a content element. The content elements may be data that are designated to be not shared. The content elements may include secure, private, personal, confidential, or other data that a user or computing policy designates as not shareable. For example, a paragraph of text may describe generic information regarding a medical condition. The paragraph of text may also identify a person that is currently experiencing the medical condition, and the identity of the person may be considered a contented element. The monitoring and/or identification of a content element may be based on one or more artificial intelligence techniques (e.g., machine learning, image processing, natural language processing, neural networking).

If a content element is identified, at 530: Y, the video stream of the screen sharing session may be intercepted at 540. The interception of the video stream may include retrieving, copying, blocking, deleting, removing, or otherwise obtaining the video stream in such as a way that the video stream is prevented from reaching its target. For example, a video stream may be intercepted from an outbound queue, such as a network stack or file output of a host device. The interception of the video stream may include interception while the video stream is in transit, such as from a network server that is a communication intermediary of the host device and any target devices. The interception of the video stream may include a stream from a target device. For example, a video stream may be obtained by a daemon, job, or other software construct that operates on a target device, before the target device displays the video stream to a user.

At 550, the video stream of the screen sharing session may be altered. The alteration may include blurring, obscuring, deemphasizing, blacking or whiting out, or otherwise changing the video stream such that the content element cannot be viewed, inspected, or otherwise observed. Alteration of the video stream may include altering the portion of the video stream such that a human cannot view or comprehend the content element. Alteration of the video stream may include replacing a content element with warning data. For example, a video stream of a screen sharing session includes a depiction of an application window that contains text of a user's health data. Continuing the example, alteration of the video stream may include removing the text that contains the user's health data, and replacing it with generic text, such as "redacted information" or "private data" or other warning information. Alteration of the video stream may include replacing a content element with non-specific data. For example, a video stream of a screen sharing session includes a depiction of an application window that contains text including private financial information. Continuing the example, alteration of the video stream may include removing the text containing the private financial information, and replacing it with generic phrase, such as "the company financial information can be located by referring to the company website" or another non-specific statement or sentence.

Alteration of the video stream may include replacing the video stream with a second video stream. In detail, a screen sharing session is intercepted that includes a first video stream. The first video stream may include information that is targeted as specific individuals and specific people. The alteration may include generating a second video stream as part of the screen sharing session and sending that second video stream to a first target device. The second video stream may include information that is an appropriate equivalent to the recipient or user of the first target device. For example, a video stream that is part of a screen sharing presentation on how to appropriate take care of national parks through an entire nation may include a generic picture of a tree. Continuing the example, the video stream may be viewed by a viewer on a first target device and located in a first geographic location. As part of being altered, the generic picture may be replaced with a second video stream that contains a targeted picture of a national park that is located geographically near the first target device. Further continuing the example, the video stream may be viewed by a second viewer on a second target device and located in a second geographic location. As part of being altered, the generic picture may be replaced with a third video stream that contains a targeted picture of a national monument that is located geographically near the second target device.

After the video stream of the screen sharing session is altered at 550, or alternatively if there was no content element identified at 530: N, method 500 may end at 595.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to explain the principles of the embodiments, the practical application or technical improvement over technologies found in the marketplace, or to enable others of ordinary skill in the art to understand the embodiments disclosed herein.

What is claimed is:

1. A method comprising:
   detecting, by a first computing device, a screen sharing session of a host computing device,
      wherein the screen sharing session includes a first video stream of a graphical user interface, and
      wherein the screen sharing session is directed to a set of one or more target computing devices;
   monitoring, by a machine learning model, the screen sharing session for a set of one or more content elements, wherein the machine learning model is trained on a set of training data that includes application statuses, the application statuses captured during a usage session of the host computing device and comprising information from a renderer, information from a kernel, and information from an operating system;
   identifying, based on the screen sharing session and in response to the monitoring, a first content element of the set of content elements in the first video stream;
   intercepting, in response to the identification of the first content element, the first video stream; and
   altering, based on the first content element, the first video stream, wherein the altering is executed in a first way for a first target computing device based on user preferences of a first user and where the altering is executed in a second way for a second target computing device based on user preferences of a second user.

2. The method of claim 1, wherein the first computing device is the host computing device.

3. The method of claim 1, wherein the first computing device is the first target computing device of the set of target computing devices.

4. The method of claim 1, wherein the identification is further based on a textual input to the host computing device.

5. The method of claim 1, wherein the identification is further based on an application status of the host computing device.

6. The method of claim 1, wherein the machine learning model trained on additional training data that includes one or more images, the one or more images captured during a second usage session of the host computing device.

7. The method of claim 1, wherein the machine learning model is trained on additional training data that includes one or more textual inputs, the one or more textual inputs captured during a second usage session of the host computing device.

8. The method of claim 1, wherein the altering is selected from the group consisting of blurring, obscuring, and smearing.

9. The method of claim 1, wherein the altering includes replacing the first content element with a new content element that is not part of the set of content elements.

10. A system, the system comprising:
    a memory, the memory containing one or more instructions; and
    a processor, the processor communicatively coupled to the memory, the processor, in response to reading the one or more instructions, configured to:
    detect a screen sharing session of a host computing device,
       wherein the screen sharing session includes a first video stream of a graphical user interface, and
       wherein the screen sharing session is directed to a set of one or more target computing devices;
    monitor, by a machine learning model, the screen sharing session for a set of one or more content elements, wherein the machine learning model is trained on a set of training data that includes application statuses, the application statuses captured during a usage session of the host computing device and comprising information from a renderer, information from a kernel, and information from an operating system;
    identify, based on the screen sharing session and in response to the monitoring, a first content element of the set of content elements in the first video stream;

intercept, in response to the identification of the first content element, the first video stream; and alter, based on the first content element, the first video stream, wherein the altering is executed in a first way for a first target computing device based on user preferences of a first user and where the altering is executed in a second way for a second target computing device based on user preferences of a second user.

11. The system of claim 10, wherein the identification is further based on a textual input to the host computing device.

12. A computer program product, the computer program product comprising:

one or more computer readable storage media; and program instructions collectively stored on the one or more computer readable storage media, the program instructions configured to:

detect a screen sharing session of a host computing device, wherein the screen sharing session includes a first video stream of a graphical user interface, and wherein the screen sharing session is directed to a set of one or more target computing devices;

monitor, by a machine learning model the screen sharing session for a set of one or more content elements, wherein the machine learning model is trained on a set of training data that includes application statuses, the application statuses captured during a usage session of the host computing device and comprising information from a renderer, information from a kernel, and information from an operating system;

identify, based on the screen sharing session and in response to the monitoring, a first content element of the set of content elements in the first video stream;

intercept, in response to the identification of the first content element, the first video stream; and alter, based on the first content element, the first video stream, wherein the altering is executed in a first way for a first target computing device based on user preferences of a first user and where the altering is executed in a second way for a second target computing device based on user preferences of a second user.

13. The computer program product of claim 12, wherein the identification is further based on an application status of the host computing device.

14. The computer program product of claim 12, wherein the altering is selected from the group consisting of blurring, obscuring, and smearing.

\* \* \* \* \*